(12) United States Patent
Kim et al.

(10) Patent No.: US 10,003,109 B2
(45) Date of Patent: Jun. 19, 2018

(54) SECONDARY BATTERY

(71) Applicant: SAMSUNG SDI CO., LTD., Yongin-si, Gyeonggi-do (KR)

(72) Inventors: Hong Jeong Kim, Yongin-si (KR); Jong Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 297 days.

(21) Appl. No.: 14/666,230

(22) Filed: Mar. 23, 2015

(65) Prior Publication Data

US 2015/0325887 A1 Nov. 12, 2015

(30) Foreign Application Priority Data

May 8, 2014 (KR) ........................ 10-2014-0054900

(51) Int. Cl.
*H01M 10/42* (2006.01)
*H01M 2/02* (2006.01)

(52) U.S. Cl.
CPC ..... *H01M 10/4264* (2013.01); *H01M 2/0212* (2013.01); *H01M 2/0217* (2013.01); *H01M 2/0287* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 6,808,845 | B1 * | 10/2004 | Nonaka | H01M 4/0404 361/502 |
| 2011/0189533 | A1 * | 8/2011 | Reis | H01M 2/1077 429/178 |
| 2012/0286719 | A1 * | 11/2012 | Lee | H01M 10/425 320/103 |

FOREIGN PATENT DOCUMENTS

| | | |
|---|---|---|
| JP | 2004-047369 A | 2/2004 |
| JP | 4825344 B2 | 9/2011 |
| KR | 10-2006-0076680 A | 7/2006 |

* cited by examiner

*Primary Examiner* — Sarah A. Slifka
(74) *Attorney, Agent, or Firm* — Lewis Roca Rothgerber Christie LLP

(57) ABSTRACT

A secondary battery includes an electrode assembly, and a case configured to accommodate the electrode assembly. At least a portion of the case includes a first insulation layer, a second insulation layer, and a capacitor between the first insulation layer and the second insulation layer, and the first insulation layer is nearer to the electrode assembly than the second insulation layer.

14 Claims, 3 Drawing Sheets

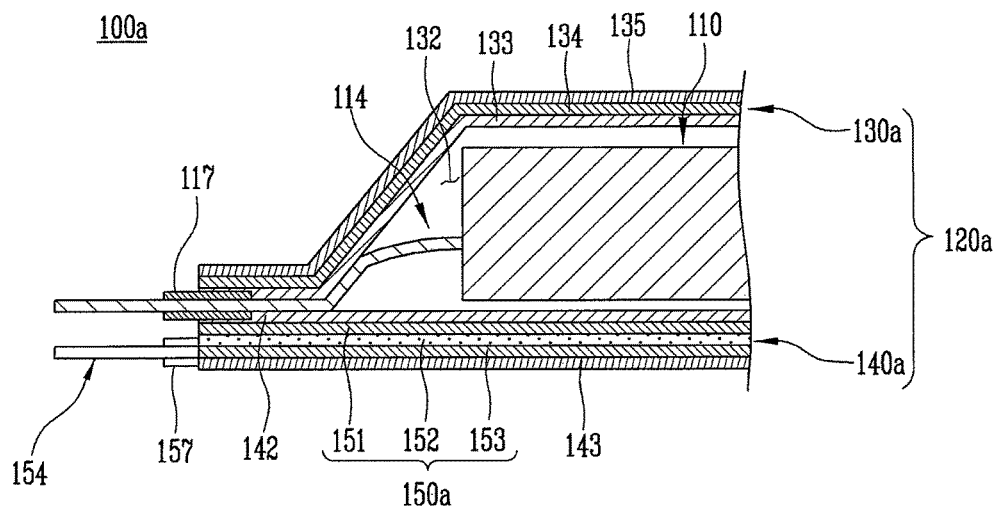
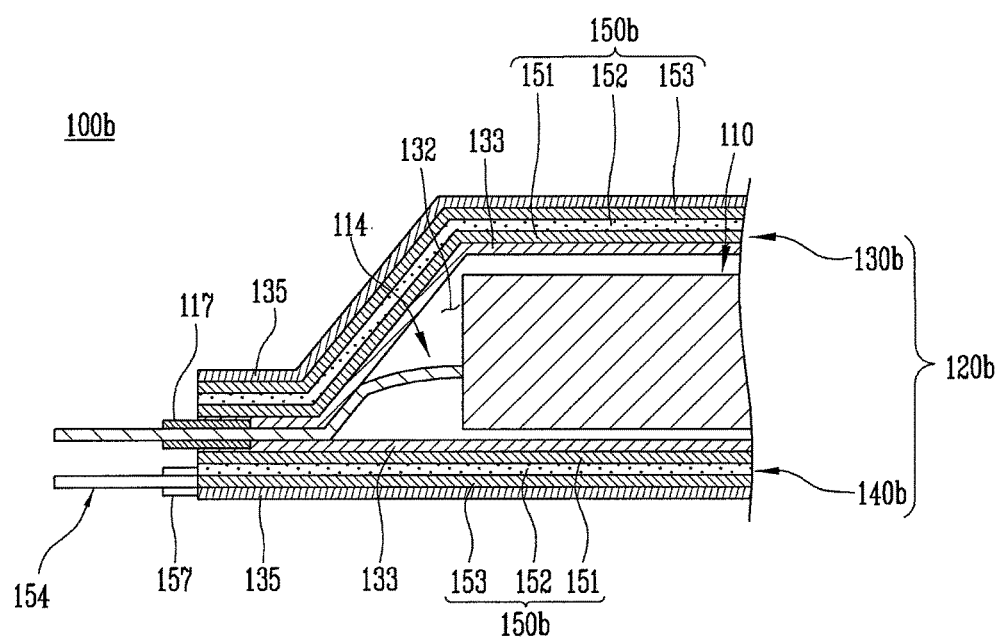

SECONDARY BATTERY

CROSS-REFERENCE TO RELATED APPLICATION

This application claims priority to and the benefit of Korean Patent Application No. 10-2014-0054900, filed on May 8, 2014 in the Korean Intellectual Property Office, the contents of which are incorporated herein by reference in their entirety.

BACKGROUND

1. Field

The present invention relates to a secondary battery.

2. Description of the Related Art

Because a secondary battery, which is widely used as a power source of, for example, a portable electronic device, may be reversibly charged or discharged many times, the secondary battery is reusable. Thus, efficient use of the secondary battery is possible. Further, the secondary battery may have various forms and shapes depending on an external electronic device to which the secondary battery is applied. As such, the secondary battery may effectively accumulate energy according to its volume and mass, so that the secondary battery is widely used as the power source of the portable electronic device.

Due to the recent development of a portable communication device, demand for the secondary battery for the communication device is gradually increasing. Therefore, various types of research have been conducted into improving the reliability and performance of the secondary battery, such as increasing a lifespan thereof.

SUMMARY

Accordingly, an aspect of the present invention is to provide a secondary battery that readily generates a relatively high current when a peak load is applied so as to improve the lifespan of the secondary battery and available time of the electronic device.

According to an embodiment of the present invention, a secondary battery includes an electrode assembly, and a case configured to accommodate the electrode assembly, wherein at least a portion of the case includes a first insulation layer, a second insulation layer, and a capacitor (e.g., a capacitor part) between the first insulation layer and the second insulation layer, and wherein the first insulation layer is nearer to the electrode assembly than the second insulation layer.

The portion of the case including the capacitor may have a thickness in a range of 130 to 200 μm. The capacitor may include a first metal layer on the first insulation layer, an electrolyte layer on the first metal layer, and a second metal layer on the electrolyte layer.

An active material may be on a surface of each of the first and second metal layers that faces the electrolyte layer.

Each of the first and second metal layers may include aluminum.

The case may include a first sub-case and a second sub-case, and the second sub-case may include the capacitor.

The first sub-case may have a recessed receiving part that is configured to accommodate the electrode assembly, and the second sub-case may cover the recessed receiving part.

The first sub-case may include a first insulation layer, a second insulation layer, and a metal layer between the first insulation layer and the second insulation layer, wherein the first insulation layer is nearer to the electrode assembly than the second insulation layer.

The first sub-case may have a thickness in a range of 50 to 80 μm.

The first sub-case may include the capacitor.

The electrode assembly may include a first electrode plate, a second electrode plate, and a separator between the first and second electrode plates.

The electrode assembly may include a first electrode, the capacitor may include a second electrode, and the first electrode and the second electrode may be electrically coupled to each other.

The electrode assembly and the capacitor may be electrically coupled to each other in parallel.

The case may be a pouch.

Other features and aspects of the present invention will become apparent from the following description taken in connection with the accompanying drawings.

The terminologies or words used in the description and the claims of the present application should not be interpreted as being limited merely to common and dictionary meanings. They should be interpreted based on the meanings and concepts of the present invention in keeping with the scope of the present invention on the basis of the principle that the inventor(s) can appropriately define the terms in order to describe the invention in the best way.

According to an embodiment of the present invention, the capacitor is included in the case, thus making it easy to generate a high current when the peak load is applied, thereby improving the lifespan of the secondary battery.

BRIEF DESCRIPTION OF THE DRAWINGS

Example embodiments will now be described more fully hereinafter with reference to the accompanying drawings; however, the present invention may be embodied in different forms and should not be construed as limited to the embodiments set forth herein. Rather, these embodiments are provided so that this disclosure will be thorough and complete and will fully convey the scope of the present invention to those skilled in the art.

In the drawings, dimensions may be exaggerated for clarity of illustration. It will be understood that when an element is referred to as being "between" two elements, it can be the only element between the two elements or one or more intervening elements may also be present. Similarly, when a first element is described as being "coupled" or "connected" to a second element, the first element may be directly "coupled" or "connected" to the second element, or one or more other intervening elements may be located between the first element and the second element. Like reference numerals refer to like elements throughout.

FIG. 3 is a sectional view of the secondary battery taken along the line A-A' of FIG. 1; and FIG. 4 is a sectional view showing a secondary battery according to another embodiment of the present invention.

DETAILED DESCRIPTION

Figure 1:
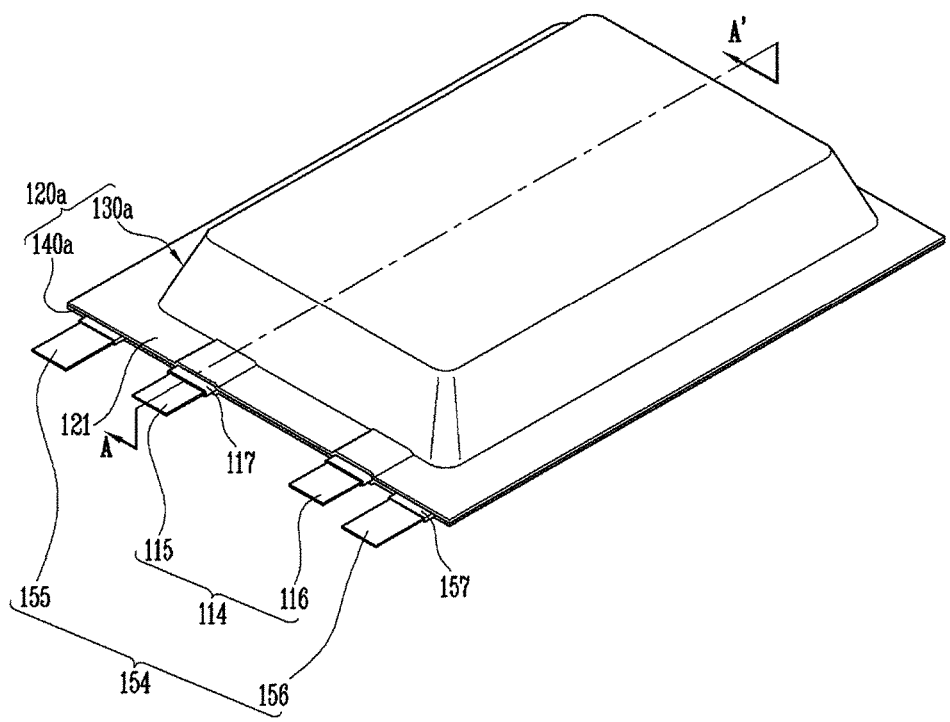
FIG. 1 is a perspective view showing a secondary battery according to an embodiment of the present invention.

The present invention will be described more fully hereinafter with reference to the accompanying drawings, in which example embodiments of the present invention are shown. Further, like reference numerals are used to identify like elements throughout different drawings. While example embodiments of the present invention have been described using specific terms, such description is for illustrative purposes only, and it is to be understood that changes and variations may be made without departing from the spirit or scope of the present invention. In the following description, if a detailed description of certain known functions or configurations related to the present invention makes the subject matter of the present invention unclear, the detailed description may be omitted.

Hereinafter, example embodiments of the present invention will be described in detail with reference to the accompanying drawings.

Figure 2:
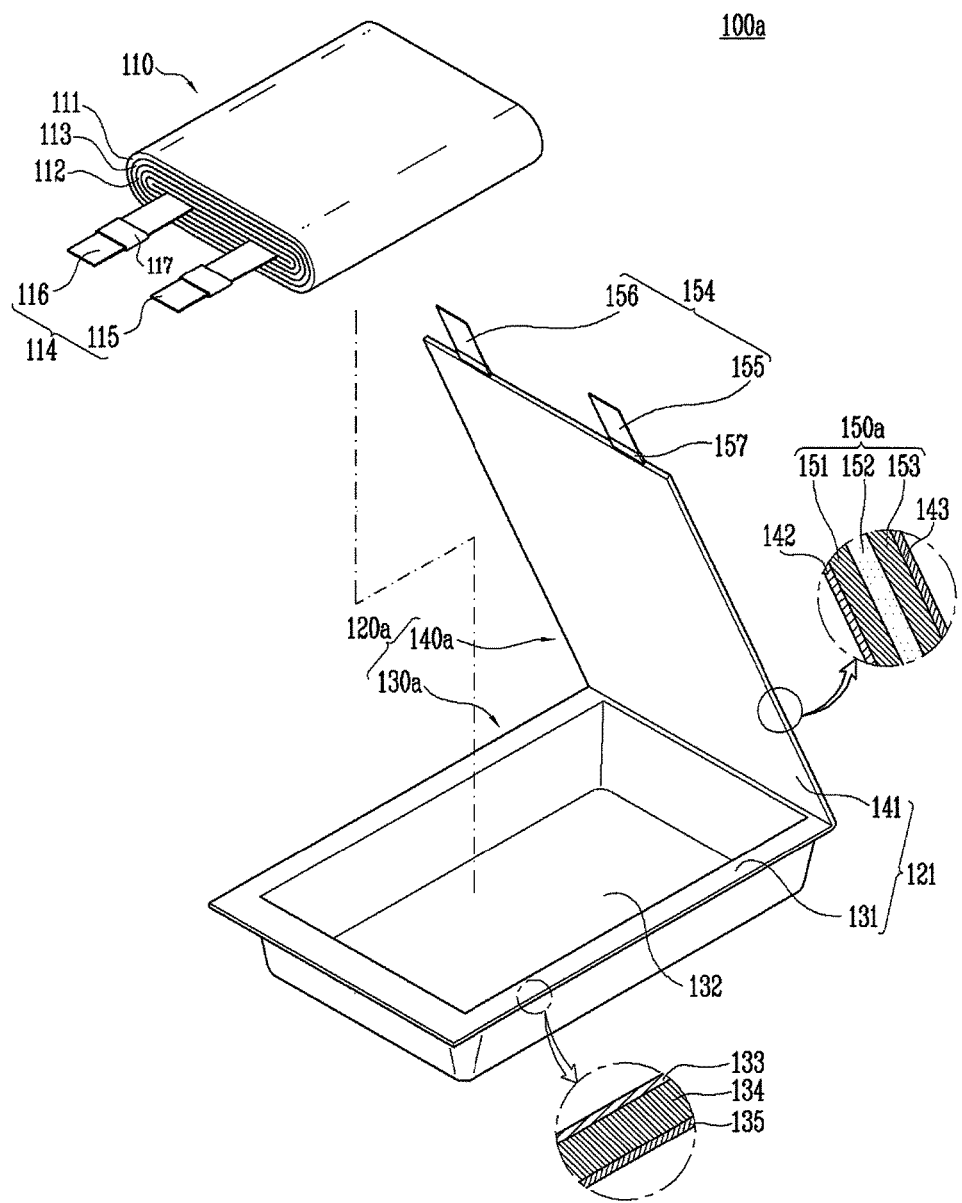
FIG. 2 is an exploded perspective view of the secondary battery shown in FIG. 1.

FIG. 1 is a perspective view showing a secondary battery 100a according to an embodiment of the present invention, and FIG. 2 is an exploded perspective view of the secondary battery 100a shown in FIG. 1. Hereinafter, the secondary battery 100a according to this embodiment will be described with reference to FIGS. 1 and 2. FIG. 2 shows the secondary battery 100a of FIG. 1 in which the secondary battery 100a is turned upside down for the convenience of illustration and description.

As shown in FIGS. 1 and 2, the secondary battery 100a according to this embodiment includes an electrode assembly 110 and a case 120a, and at least portion of the case 120a may include a capacitor part (e.g., a capacitor) 150a.

When the secondary battery is used as a power source of an electronic device, such as a smartphone, a state (e.g., an amount) of an electric current outputted by the secondary battery may vary depending on the characteristics and usage pattern of the electronic device to which it is attached. However, a user expects the secondary battery to have a long lifespan as well as to provide a long available time of the electronic device (e.g., a high capacity). Further, the electronic device requires different amounts of the electric current in an operation mode compared to a standby mode. However, a conventional secondary battery has a high capacity or a high output. As such, the conventional secondary battery possesses only one of the above-described characteristics.

Further, the states or conditions of using the electronic device may generally include a base load that corresponds to a state in which a relatively low current is consumed, and a peak load that corresponds to a state in which a relatively high current is abruptly consumed. For instance, the peak load is the state that requires relatively high output for a relatively short period of time. An example of the peak load is the case in which an outgoing call is made by a GSM (Global System for Mobile Communications) mobile phone (e.g., a millisecond level of very short and high output pulses). Another example of the peak load may include an AP burst phenomenon that momentarily increases the output when a moving picture, a game, or the like is driven in a notebook computer, a tablet, or the like (e.g., a sub-second level of medium output pulses). Here, when the conventional (e.g., high capacity) secondary battery is used as the power source of the electronic device experiencing a considerable change in load, the conventional secondary battery may have difficulty flexibly coping with a change from the base load to the peak load in the electronic device. Because this condition repeatedly arises, deterioration of the secondary battery may be accelerated, and thereby, its lifespan and the available time of the attached electronic device may be reduced. Further, the secondary battery having superior output characteristics usually has a relatively low capacity. Thus, when using such a secondary battery as the power source, the available time of the electronic device may be undesirably shortened.

Accordingly, the secondary battery 100a according to one embodiment of the present invention is configured such that the capacitor part 150a is included in the case 120a. Thereby, the electrode assembly 110 may be utilized for its high capacity characteristics, while the capacitor part 150a may be utilized for its high output characteristics (e.g., the electrode assembly 110 may provide high capacity while the capacitor part 150a may provide high output). For example, in the base load state, the electrode assembly 110 of the power source, which has the relatively high capacity, may be utilized. In the peak load state, it is possible to rapidly generate a relatively high current using the capacitor part 150a. Thus, such a change in load does not damage the secondary battery 100a, thereby improving the lifespan of the secondary battery by flexibly coping with a great change in load of the electronic device in addition to increasing an available time of the electronic device.

The electrode assembly 110 has a first electrode 114 on a side thereof. The electrode assembly 110 forms the secondary battery 100a along with the case 120a and stores and releases electrochemical energy by the transfer of ions or electrons.

The electrode assembly 110 may include a first electrode plate 111, a second electrode plate 112, a separator 113 interposed between the first electrode plate 111 and the second electrode plate 112. The first electrode 114 extends from the electrode assembly 110 to be exposed to the outside of the case 120a and has a first electrode tab 115 and a second electrode tab 116. The first electrode plate 111 and the second electrode plate 112 may include an anode plate and a cathode plate, respectively, and the first electrode tab 115 and the second electrode tab 116 may include an anode tab and a cathode tab, respectively.

The separator 113 is configured to prevent the first electrode plate 111 from being in direct contact with the second electrode plate 112. The separator 113 may include a porous insulator to allow ions or electrolyte to flow between the first electrode plate 111 and the second electrode plate 112. For example, two separators 113 may be interposed between the first electrode plate 111 and the second electrode plate 112, which are wound together. The electrode assembly 110 may be manufactured by various suitable methods, for example, by winding or stacking the first electrode plate 111, the second electrode plate 112, and the separator 113 together. Of course, embodiments of the present invention may include all kinds of suitable electrode assemblies, such as a stacked or a wound electrode assembly, and is not limited to any one or more particular kinds of electrode assemblies.

The electrode assembly 110 may be accommodated in the case 120a along with an electrolyte. The electrolyte allows the ions to move between the first and second electrode plates 111 and 112. Further, the first electrode 114 protrudes out from the case 120a, thus transmitting electrochemical energy stored in the secondary battery 100a to the outside.

The case 120a accommodates the electrode assembly 110 therein. For example, the case 120a may include a first sub-case 130a and a second sub-case 140a.

By way of example, a recessed receiving part (e.g., a recessed receiving area) 132 may be formed in the first sub-case 130a to receive the electrode assembly 110, and the second sub-case 140a may be implemented to cover the first sub-case 130a (e.g., to cover the recessed receiving part 132). Thus, the receiving part 132 of the first sub-case 130a may be provided to correspond to the shape and size of the electrode assembly 110. For example, it is possible to manufacture the receiving part 132 through a deep drawing process to form a seamless, hollow container from a flat plate. The first sub-case 130a and the second sub-case 140a may be coupled to each other by a sealing part 121 which is formed along an outer circumference of a pouch. For example, after the electrode assembly 110 and the electrolyte are put into the receiving part 132 of the first sub-case 130a, the first sub-case 130a comes into close contact with the second sub-case 140a. In such a state, a first outer periphery (e.g., a first outer circumference) 131 of the first sub-case 130a and a second outer periphery (e.g., a second outer circumference) 141 of the second sub-case 140a are thermally bonded to each other to form the sealing part 121. That is, according to this embodiment, the case 120a may be a pouch. Here, the first electrode 114 of the electrode assembly 110 may protrude out through the sealing part 121.

Although, in this embodiment, the receiving part 132 is formed in the first sub-case 130a and the second sub-case 140a covers the first sub-case 130a, both of the first sub-case 130a and the second sub-case 140a may include the receiving part such that each sub-case receives approximately half of the electrode assembly 110. Further, embodiments of the present invention may be applied to a square- or cylinder-shaped case and is not limited to the pouch-shaped case 120a.

FIG. 3 is a sectional view of the secondary battery 100a taken along the line A-A' of FIG. 1. Hereinafter, the case 120a according to this embodiment will be described in further detail with reference to FIG. 3.

As shown in FIG. 3, at least portion of the case 120a according to this embodiment may include the capacitor part 150a. The capacitor part 150a may act as a power source that is different from the electrode assembly 110 and may be designed to release a relatively high current at the peak load in response to high output. Because the capacitor part 150a is a part of (e.g., embedded or included in) the case 120a, it is possible to reduce the size and weight of the secondary battery compared with a secondary battery configured such that a capacitor is separately provided.

According to the above-described embodiment, the case 120a may include the first sub-case 130a and the second sub-case 140a. In this embodiment, considering that an additional forming process is used to form the receiving part 132 in the first sub-case 130a, it may be simpler to provide the capacitor part 150a in the second sub-case 140a rather than in the first sub-case 130a. That is, according to this embodiment, the second sub-case 140a may include the capacitor part 150a.

The first sub-case 130a may include, for example, a first insulation layer 133, a metal layer 134, and a second insulation layer 135 arranged in this order in a direction from the electrode assembly 110 toward an outside of the first sub-case 130a. The first insulation layer 133 is the layer that directly faces the electrode assembly 110, and the second insulation layer 135 is the layer that corresponds to the outermost surface of the first sub-case 130a. Each of the first insulation layer 133 and the second insulation layer 135 may be made of a polymer resin that is a non-conductor (e.g., that is electrically insulative) so as to prevent a short circuit from occurring. Because a portion of the first insulation layer 133 may form the sealing part 121 to couple the first sub-case 130a with the second sub-case 140a, the first insulation layer 133 may include a polyolefin-based substance, such as casted polypropylene (CPP). Because the second insulation layer 135 is located at an outermost position to protect the secondary battery 100a from the outside, it may include a high-strength polymer substance, such as nylon. Further, the metal layer 134 may be provided between the first insulation layer 133 and the second insulation layer 135 to increase a mechanical strength of the case 120a (e.g., to give the case 120a a predetermined mechanical strength) and may include, for example, aluminum. The thickness of the first sub-case 130a may be in a range of about 50 to about 80 μm.

Because the second sub-case 140a includes the capacitor part 150a, it may have a layered structure that is different from that of the first sub-case 130a. For example, the second sub-case 140a may include a third insulation layer 142, the capacitor part 150a, and a fourth insulation layer 143 arranged in this order in a direction from the electrode assembly 110 toward an outside of the second sub-case 140a. For example, the capacitor part 150a may include a first metal layer 151, an electrolyte layer 152, and a second metal layer 153 arranged in this order in a direction from the third insulation layer 142 toward the fourth insulation layer 143. In this regard, the third insulation layer 142 of the second sub-case 140a may be made of a material corresponding to that of the first insulation layer 133 of the first sub-case 130a, and the fourth insulation layer 143 of the second sub-case 140a may be made of a material corresponding to that of the second insulation layer 135 of the second sub-case 140a.

Further, the first metal layer 151 and the second metal layer 153 may be provided on opposite sides of the electrolyte layer 152, and an active material may be applied to a surface of each of the first and second metal layers 151 and 153 facing the electrolyte layer 152. For example, either of the first metal layer 151 or the second metal layer 153 may contain active carbon, a polymer, or $LiM_xO_y$ (wherein M includes one or more elements selected from the group consisting of Co, Ni, Mn, Fe, and Ti) as the active material to serve as an anode, while the remaining one may contain active carbon, graphite, metal (e.g., Si, Sn, etc.), or an alloy (e.g., an Si-based alloy, an Sn-based alloy, etc.) as the active material to serve as a cathode. Because the first metal layer 151 and the second metal layer 153 act as a base material, each of the first and second metal layers 151 and 153 may contain aluminum. Further, the electrolyte layer 152 allows ion exchange between the first and second metal layers 151 and 153. The electrolyte layer 152 may be in a gel- or solid-phase, for example. However, the capacitor part 150a of embodiments of the present invention is not limited thereto.

Electric energy discharged from the capacitor part 150a is discharged out of the case 120a. In this embodiment, the electric energy may be transmitted to the outside through a second electrode 154 which includes a third electrode tab 155 coupled to (e.g., connected to) the first metal layer 151 and a fourth electrode tab 156 coupled to the second metal layer 153. However, the second electrode 154 of embodiments of the present invention does not necessarily protrude out of the case 120a. For example, the second electrode 154 may be coupled to the first electrode 114 in the case 120a and only the first electrode 114 may protrude out of the case 120a. Alternatively, the first electrode 114 and the second electrode 154 may be coupled to each other in the case 120a and only the second electrode 154 may protrude out of the case 120a. Further, the capacitor part 150a and the electrode assembly 110 may be coupled (e.g., electrically coupled) in parallel through the electric connection between the second electrode 154 and the first electrode 114. Thus, the electrode assembly 110 may function as the power source at the base load, and the capacitor part 150a may assist the power source at the peak load. Insulating electrode films 117 and 157 may be included in the secondary battery to prevent the first and second electrodes 114 and 154 from causing a short-circuit with the metal layer 134 of the first sub-case 130a or with the first and second metal layers 151 and 153 of the second sub-case 140a.

Because the second sub-case 140a includes the capacitor part 150a, it may be thicker than the first sub-case 130a having the metal layer 134 instead of the capacitor part 150a. For example, the second sub-case 140a may have a thickness in a range of about 130 to about 200 μm.

FIG. 4 is a sectional view showing a secondary battery 100b according to another embodiment of the present invention. Hereinafter, the secondary battery 100b according to this embodiment will be described with reference to FIG. 4. Components common to both the embodiments will have the same reference numerals, and a duplicated description thereof may be omitted herein.

As shown in FIG. 4, the secondary battery 100b according to this embodiment includes a case 120b having a capacitor part 150b and an electrode assembly 110 accommodated in the case 120b. Both of the first sub-case 130b and the second sub-case 140b may include a first insulation layer 133, the capacitor part 150b, and a second insulation layer 135. That is, unlike the previous embodiment, the capacitor part 150b may be included in the first sub-case 130b having the receiving part 132 as well as in the second sub-case 140b. In this embodiment, when the capacitor part 150b is included in both the first sub-case 130b and the second sub-case 140b, most of the surface of the case 120b includes two metal layers, namely, the first metal layer 151 and the second metal layer 153. Hence, the strength of the case 120b may be increased as compared to an embodiment in which only one metal layer 134 is included in one of the first and second sub-cases. Therefore, even when the case 120b is the pouch, the secondary battery 100b may not only be used as an internal battery of the electronic device, such as a mobile phone, but may also be used as a detachable, external battery. When the secondary battery 100b according to this embodiment is used as the external battery, a label may be attached to the secondary battery 100b that includes information regarding the secondary battery. Further, the capacitor part 150b is included in both the first sub-case 130b and the second sub-case 140b, thus increasing the capacity of the capacitor part 150b and thereby increasing the available time of the electronic device at the peak load.

In the above-described embodiments, the embodiment in which the capacitor part 150a is included in the second sub-case 140a and the embodiment in which the capacitor part 150b is included in both the first sub-case 130b and the second sub-case 140b have been described. However, the present invention may also include an embodiment in which the capacitor part is included in only the first sub-case. That is, the present invention is not limited to the above-described embodiments.

Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A secondary battery comprising:
   an electrode assembly; and
   a case configured to accommodate the electrode assembly, wherein at least a portion of the case comprises a first insulation layer, a second insulation layer, and a capacitor between the first insulation layer and the second insulation layer,
   wherein the capacitor comprises:
      a first metal layer on the first insulation layer;
      an electrolyte layer on the first metal layer; and
      a second metal layer on the electrolyte layer, and
   wherein the first insulation layer is nearer to the electrode assembly than the second insulation layer.

2. The secondary battery of claim 1, wherein the portion of the case comprising the capacitor has a thickness in a range of 130 to 200 pm.

3. The secondary battery of claim 1, wherein an active material is on a surface of each of the first and second metal layers that faces the electrolyte layer.

4. The secondary battery of claim 1, wherein each of the first and second metal layers comprises aluminum.

5. The secondary battery of claim 1, wherein the case comprises a first sub-case and a second sub-case, and
   wherein the second sub-case comprises the capacitor.

6. The secondary battery of claim 5, wherein the first sub-case has a recessed receiving part that is configured to accommodate the electrode assembly, and
   wherein the second sub-case covers the recessed receiving part.

7. The secondary battery of claim 6, wherein the first sub-case comprises:
   a first insulation layer;
   a second insulation layer; and
   a metal layer between the first insulation layer and the second insulation layer,
   wherein the first insulation layer is nearer to the electrode assembly than the second insulation layer.

8. The secondary battery of claim 5, wherein the first sub-case has a thickness in a range of 50 to 80 μm.

9. The secondary battery of claim 5, wherein the first sub-case comprises the capacitor.

10. The secondary battery of claim 1, wherein the electrode assembly comprises a first electrode plate, a second electrode plate, and a separator between the first and second electrode plates.

11. The secondary battery of claim 1, wherein the electrode assembly comprises a first electrode,
   wherein the capacitor comprises a second electrode, and
   wherein the first electrode and the second electrode are electrically coupled to each other.

12. The secondary battery of claim 1, wherein the electrode assembly and the capacitor are electrically coupled to each other in parallel.

13. The secondary battery of claim 1, wherein the case comprises a pouch.

14. The secondary battery of claim 1, wherein the electrode assembly comprises a first electrode tab and a second electrode tab extending outside of the case, and
   wherein the case further comprises a third electrode tab and a fourth electrode tab extending therefrom, the third and fourth electrode tabs being electrically connected to the capacitor.

* * * * *